United States Patent [19]
Takayama et al.

[11] Patent Number: 6,017,210
[45] Date of Patent: *Jan. 25, 2000

[54] APPARATUS FOR DWELLING IN INJECTION MOLDING

[75] Inventors: Kazutoshi Takayama; Kiyoto Takizawa, both of Nagano-ken, Japan

[73] Assignee: Nissei Plastics Industrial Co., Ltd., Nagano-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/720,289

[22] Filed: Sep. 26, 1996

[30] Foreign Application Priority Data

Sep. 27, 1995 [JP] Japan .................................... 7-272088

[51] Int. Cl.⁷ .................................................. B29C 45/54
[52] U.S. Cl. ........................ 425/557; 264/328.1; 425/562
[58] Field of Search .............................. 264/328.1, 328.8, 264/328.19; 425/555, 557, 558, 559, 560, 561, 562, 567

[56] References Cited

U.S. PATENT DOCUMENTS

| 4,342,717 | 8/1982 | Gardner | 264/328.8 |
| 4,784,819 | 11/1988 | Spurr | 425/560 |
| 5,071,341 | 12/1991 | Poehlsen | 425/557 |
| 5,135,701 | 8/1992 | Farrell | 425/558 |

FOREIGN PATENT DOCUMENTS

| 80070 | 1/1963 | France | 425/561 |
| 2034163 | 2/1971 | Germany | 425/562 |
| 4113034 | 7/1965 | Japan . | |
| 4-70317 | 3/1992 | Japan | 425/562 |
| 418838 | 4/1992 | Japan . | |
| 6505926 | 7/1994 | Japan . | |
| 2260101 | 4/1993 | United Kingdom | 425/559 |

*Primary Examiner*—Jill L. Heitbrink
*Attorney, Agent, or Firm*—Weingarten, Schurgin, Gagnebin & Hayes LLP

[57] ABSTRACT

To avoid generation of air bubbles and silver which otherwise may be caused due to forced retraction of a dwelling plunger after a dwelling cycle is completed. A dwelling cycle is performed at the same time of metering by using an injection machine 1 and a dwelling machine 2. The injection machine 1 comprises an injection screw 11 mounted in a heating cylinder 12. The dwelling machine 2 comprises a dwelling plunger 21 slidably mounted therein and faced to a resin passage 14. An advancing motion of the dwelling plunger 14 is limited to the side surface of the resin passage while a backward movement of the dwelling plunger is limited to a position at which a desired volume of a resin trap 26 is formed for the resin to be packed in the passage between the head of the plunger and the resin passage 14. The dwelling plunger 21 is allowed to be in a free state during an injection cycle or the metering. The dwelling plunger 21 is retracted by means of a pressure of the resin to be injected or a pressure of a metered resin to from the resin trap 26. The resin in the resin trap 26 is forced into the resin passage 14 as the dwelling plunger 21 moves forward when the injection cycle is completed and the valve 16 is closed to block the resin passage 14. This provides the dwelling.

1 Claim, 3 Drawing Sheets

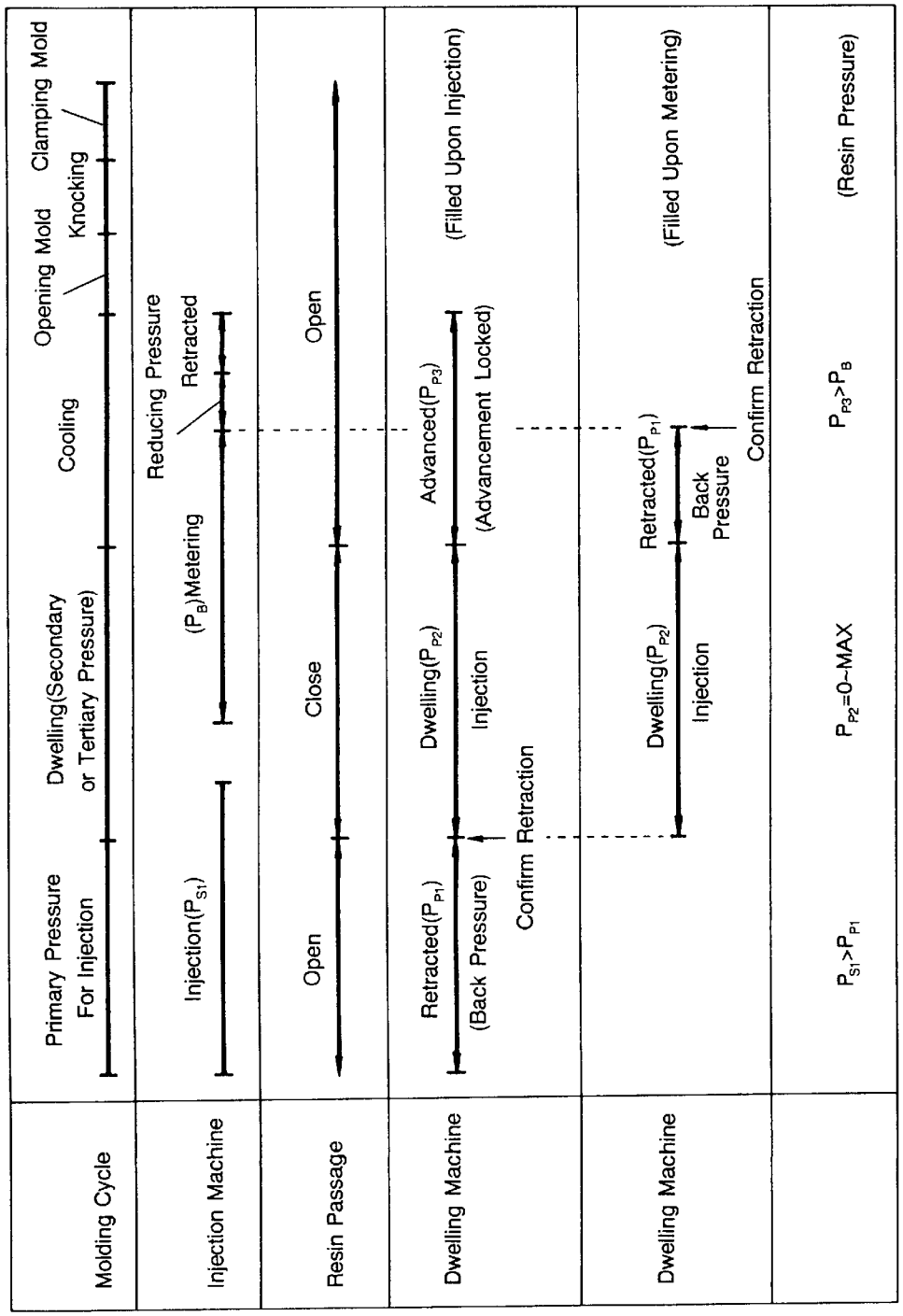

APPARATUS FOR DWELLING IN INJECTION MOLDING

BACKGROUND OF THE INVENTION

1. Field of the Invention

The present invention relates to a method of dwelling in injection molding carried out by using both an injection machine having a built-in injection screw and a dwelling machine having a built-in plunger.

2. Background Art

It is well known in the art to perform injection molding by using both an injection machine and a dwelling machine. The injection machine for this purpose is connected to the dwelling machine. More specifically, the injection machine has a heating cylinder where an injection screw is assembled in a rotatable and slidable manner. The injection machine is connected to a nozzle member through a resin passage. The resin passage is opened and closed by a valve. The dwelling machine has a hydraulic dwelling plunger slidably disposed in a cylinder at the end of the dwelling machine. The dwelling plunger faces to a portion of the resin passage downstream from the valve. For a dwelling cycle, the head of the plunger may be advanced into the resin passage to press the resin. Alternatively, a portion of the resin in the resin passage may be forced into the cylinder by means of retracting or withdrawing the plunger to its original position. This resin is then forced beck to the resin passage by means of advancing the dwelling plunger after injection of the resin into a mold is completed.

The above mentioned conventional methods tend to be affected by a negative pressure. This is mainly because the forced retraction or withdrawal of the dwelling plunger upon completion of the dwelling cycle. The amount of the pressure applied to the resin greatly relates to a backward stroke or a distance of backward movement of the dwelling plunger. A relatively large amount of resin is thus forced into the cylinder when the backward stroke used is relatively large for a higher pressure to the resin upon dwelling. The negative pressure may be a cause of defective molded article with voids, air bubbles, or silver. In addition, it is difficult to reduce the time for injection because of a limited amount of compression.

The present invention is directed to overcome the above mentioned problems in the conventional dwelling method and, an object thereof is to provide a novel method of dwelling in the injection molding in which a resin for use in dwelling is stored on a side of the resin passage without forcefully retracting the dwelling plunger after the dwelling cycle, thereby to avoid generation of air bubbles and silver and with which the stored resin is forced to solve a problem of unstable dwelling due to a change in volume.

SUMMARY OF THE INVENTION

According to the present invention, there is provided a method of dwelling in injection molding, the dwelling being performed at the same time of metering by means of an injection machine comprising a heating cylinder and an injection screw rotatably and slidably mounted in the heating cylinder, the injection machine being connected to a nozzle member through a resin passage opened and closed by a valve, and a dwelling machine comprising a hydraulic dwelling plunger having a head portion located at the resin passage which is downstream from the valve, wherein an advancing motion of the dwelling plunger is limited to the side surface of the resin passage in order to prevent the dwelling plunger from being projected into the resin passage while a backward movement of the dwelling plunger is limited to a position at which a desired volume of a resin trap is formed for the resin to be packed in the passage between the head of the plunger and the resin passage, the method comprising the steps of: making the dwelling plunger be in a free state during an injection cycle; retracting the dwelling plunger by using a pressure of the resin to be injected to form the resin trap; blocking the resin passage by means of closing the valve after the completion of the injection cycle to shift to a dwelling cycle; and forcing the resin in the resin trap into the resin passage by means of moving the dwelling plunger forward.

Furthermore, the method may comprise the steps of: making the dwelling plunger be in a free state after the resin passage is released by means of opening the valve in response to the completion of the dwelling; retracting the dwelling plunger by using a pressure of the metered resin to form the resin trap; blocking the resin passage by means of closing the valve after the completion of the injection cycle to shift to a dwelling cycle; and forcing the resin in the resin trap into the resin passage by means of moving the dwelling plunger forward.

BRIEF DESCRIPTION OF THE DRAWINGS

FIG. 3 is a view for use in describing operation of the injection machine, a resin passage, and the dwelling machine during a dwelling process.

DETAILED DESCRIPTION OF THE PREFERRED EMBODIMENTS

Figure 1:
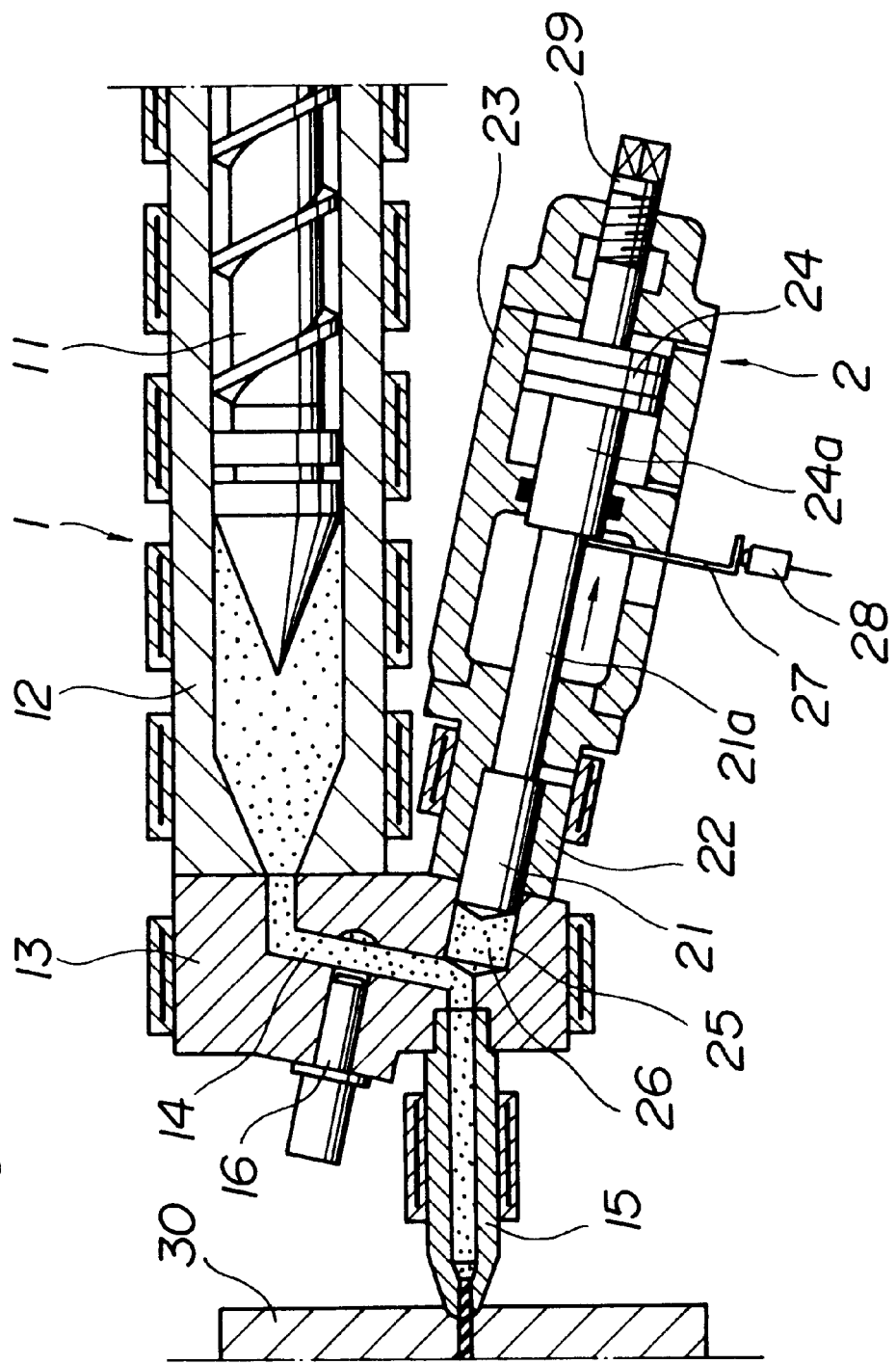
FIG. 1 is a schematic top cross-sectional view of an injection machine and a dwelling machine where a method of dwelling according to the present invention can be embodied, in which the injection machine and the dwelling machine are in a state where the metering is completed.
Figure 2:
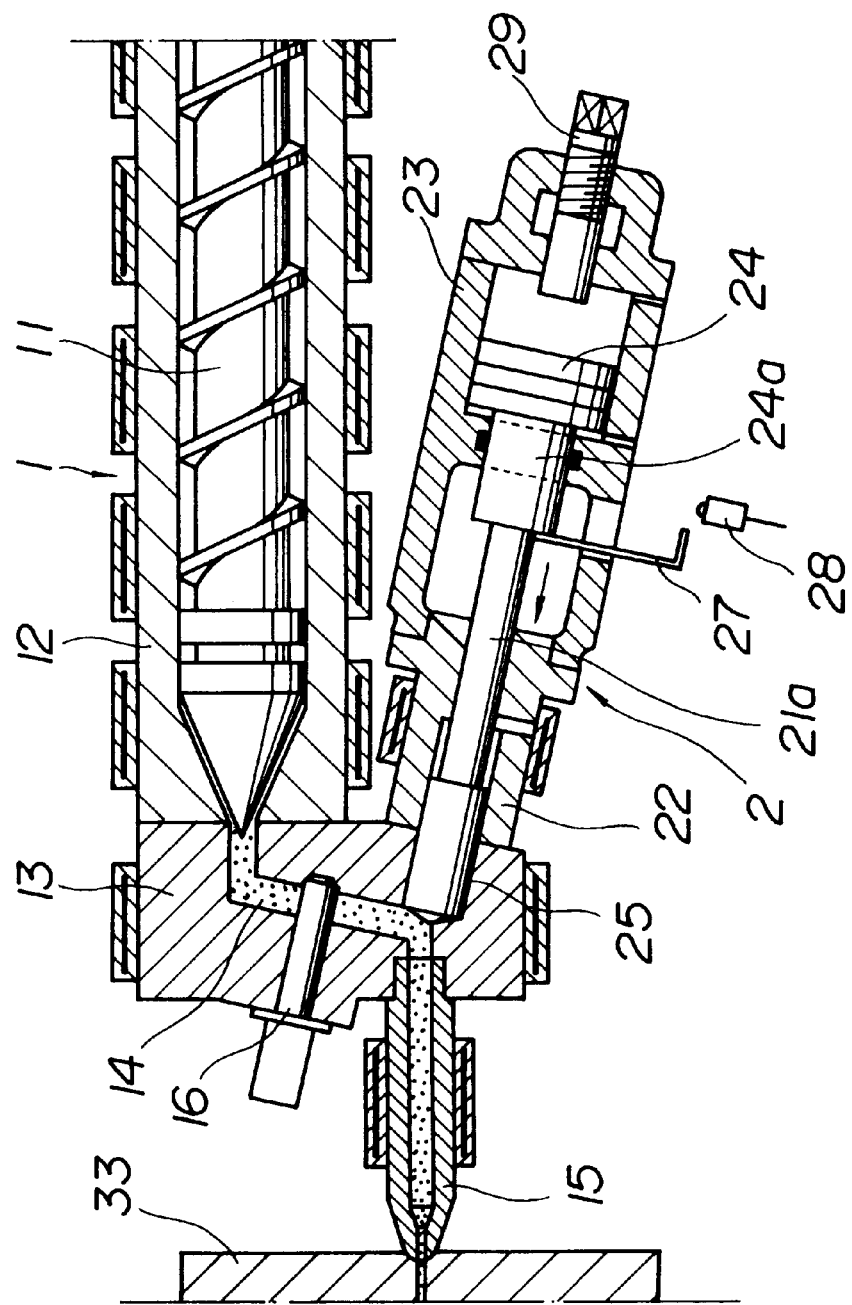
FIG. 2 is a schematic top cross-sectional view similar to FIG. 1 in which the injection machine and the dwelling machine are in a state of dwelling.

Referring to FIG. 1, an injection machine 1 comprises a heating cylinder 12 and a head member 13. An injection screw 11 is rotatably and slidably mounted in the heating cylinder 12. The head member 13 is generally rectangular and is integrally attached to an end of the heating cylinder 12. Though not illustrated in the figure, the injection machine 1 also comprises a screw driving device and a rotating device which are located behind the heating cylinder 12.

A resin passage 14 is formed through the head member 13. the resin passage 14 extends from the end of the heating cylinder 12 and a nozzle member 15. The nozzle member 15 is projected in parallel with the heating cylinder 12 from the head member 13 at a lower front portion thereof. As clearly shown in FIG. 1, the resin passage 14 has two corners and is adapted to be blocked by means of a valve 16.

A dwelling machine 2 has a dwelling plunger 21, a cylinder 22, a hydraulic cylinder 23, and a piston 24. The dwelling plunger 21 has a head portion located at the lower corner of the resin passage which is downstream from the valve 16. The dwelling plunger 21 is slidably mounted in the cylinder 22 and is operated by means of the hydraulic cylinder 23 located behind the cylinder 22. The piston 24 has a piston shaft 24a connected to a shaft portion 21a of the dwelling plunger 21.

More specifically, the dwelling plunger 21 is slidably passed from the cylinder 22 into a passage 25 formed in the head member 13. An advancing motion of the dwelling plunger 21 is limited to the side surface of the resin passage 14 in order to prevent the dwelling plunger 21 from being projected into the resin passage 14. A backward movement of the dwelling plunger 21 is limited to a position at which a desired volume of a resin trap 26 is formed for the resin to be packed in the passage 25 between the head of the plunger 21 and the resin passage 14. The resin in the resin trap 26 is forced into the resin passage 14 when the dwelling plunger 21 advances to ensure the dwelling. The backward limit of movement, i.e., a retracted position of the dwelling plunger 21 is detected by means of operating a switch 28 through a detection rod 27 projected from the piston shaft 24a. The detection rod 27 is passed through the cylinder wall out of the cylinder at the side thereof. The detection rod 27 contacts with the switch 28 when the dwelling plunger 21 is at its retracted position. A stroke for the movement of the dwelling plunger 21 can be controlled by means of adjusting the position of the piston by using a stopper 29 located at a rear portion of the piston.

An outer diameter of the dwelling plunger 21 is in a range of from 2 to 3 times larger than an inner diameter of the resin passage 14. In addition, this outer diameter is preferably in a range of from ½ to ⅓ of an outer diameter of the injection screw. An amount of the resin to be collected in the resin trap 26 is preferably around 10% of the injection amount.

A source of the backward movement of the dwelling plunger is only a pressure of the resin at the metering or at the injection. During the injection the dwelling plunger 21 is automatically retracted only by means of opening the resin passage 14 with the valve 16 for the injection after the metering is completed. The resin is then forced into the resin passage 14 by the injection screw 11. This resin is injected into a mold 30 through a nozzle opening and also presses the dwelling plunger 21 in a free state. This makes the dwelling plunger 21 be retracted, and the resin is forced into the passage 25 formed as a result of the retraction. The resin trap 26 is then formed.

This resin trap 26 is enlarged as the dwelling plunger 21 moves backward until the latter reaches the backward limit of the movement. A desired amount of the resin is collected in the passage 25 as illustrated in FIG. 1 for the subsequent dwelling. A major portion of this resin in the resin trap 26 is forced into the resin passage 14 as the dwelling plunger 21 moves forward when the injection cycle is completed and the valve 16 is closed to block the resin passage 14. This provides the dwelling.

As for the metering, it is achieved simultaneously with the dwelling by means of blocking the resin passage. More specifically, the valve 16 is opened to release the resin passage 14 after the dwelling cycle is completed. A hydraulic force of the hydraulic cylinder 24 is reduced to make the dwelling plunger 21 be in a free state. The pressure of the metered resin then presses the dwelling plunger 21. In response to this, the dwelling plunger 21 is retracted and the resin is forced into the passage 25 formed as a result of the retraction to form the resin trap 26. This resin in the resin trap 26 is forced into the resin passage 14 as the dwelling plunger 21 moves forward when the injection cycle is completed and the valve 16 is closed to block the resin passage 14. This provides the dwelling.

In the above mentioned preferred embodiment, the injection screw has an outer diameter of $\Phi 125$, while the dwelling plunger has an outer diameter of $\Phi 50$. The stroke of the movement of the plunger 21 is 65 mm. The resin trap has a volume of, for example, 127.6 cc. The dwelling pressure is 780 kg/cm$^2$ and the dwelling force is 15.31 ton. However, it is understood that the present invention is not limited to those specific examples.

As mentioned above, according to the present invention, the dwelling plunger is moved backward by using the pressure of the resin upon the metering or injection cycle to form the resin trap for the dwelling. The resin in this resin trap is forced into the resin passage to achieve the dwelling. Accordingly, it is possible to avoid generation of air bubbles and silver which otherwise may be caused due to the forced retraction of the dwelling plunger after the dwelling cycle is completed. In addition, the resin lost during the compression can be made up for by means of forcing the resin in the resin trap, so that the dwelling can be made independent of the compression amount. The injection time can thus be reduced. Furthermore, a problem due to stagnated resin because the major portion of the resin in the resin trap is forced into the resin passage.

What is claimed is:

1. An injection machine provided with a dwelling machine, said injection machine comprising:

a heating cylinder;

an injection screw rotatably and slidably mounted in the heating cylinder;

a screw driving device and rotating device located behind the heating cylinder;

a head member having opposed sides attached at one opposed side to an end of the heating cylinder; and a nozzle member projected from the head member at another of said opposed sides;

said dwelling machine comprising:
a dwelling cylinder attached to said head member at the same side as the heating cylinder;
a dwelling plunger slidably mounted in the dwelling cylinder; and
driving means for the dwelling plunger provided behind the dwelling cylinder;

wherein said head member further comprises:
a resin passage therewithin having at least one corner and extending from a portion where the heating cylinder is attached, through a portion where the dwelling cylinder is attached, to a portion where the nozzle member is attached, said resin passage providing fluid communication between said heating cylinder and said nozzle member;
a valve along said resin passage between the portion where the heating cylinder is attached and the portion where the dwelling cylinder is attached;
a resin trap proximate to and in fluid communication with said resin passage which has a predetermined volume for a resin to be packed, said resin trap located at one of said at least one corners and defined by said dwelling cylinder and the position of said dwelling plunger; and wherein
said predetermined volume is evacuated into said resin passage upon movement of said dwelling plunger.

* * * * *

UNITED STATES PATENT AND TRADEMARK OFFICE
CERTIFICATE OF CORRECTION

PATENT NO. : 6,017,210
DATED : January 25, 2000
INVENTOR(S) : Kazutoshi Takayama, et al.

Page 1 of 1

It is certified that error appears in the above-identified patent and that said Letters Patent is hereby corrected as shown below:

<u>Title page, Item [73] assignee:</u>
"Nissei Plastics Industrial Co., Ltd.," should read -- Nissei Plastic Industrial Co., Ltd., --.

<u>Column 1,</u>
Line 28, "beck" should read -- back --.

Signed and Sealed this

Eleventh Day of September, 2001

Attest:

*Nicholas P. Godici*

NICHOLAS P. GODICI
*Attesting Officer*   *Acting Director of the United States Patent and Trademark Office*